(12) United States Patent
Takada

(10) Patent No.: US 6,369,929 B2
(45) Date of Patent: Apr. 9, 2002

(54) METHOD AND APPARATUS FOR INNER FACE SCANNING WITH MULTI BEAMS

(75) Inventor: Norihisa Takada, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/847,351

(22) Filed: May 3, 2001

Related U.S. Application Data

(63) Continuation of application No. 08/961,498, filed on Oct. 30, 1997, now abandoned.

(30) Foreign Application Priority Data

Oct. 30, 1996 (JP) .............................. 8-303522
Dec. 6, 1996 (JP) .............................. 8-340370

(51) Int. Cl.$^7$ ............................................ G02B 26/08
(52) U.S. Cl. ....................... 359/204; 359/212; 359/201; 359/900; 359/223; 359/226; 347/233; 347/243
(58) Field of Search ............................. 359/204, 201, 359/202, 305, 900; 347/233, 241–244; 358/474, 491, 493; 250/234–236

(56) References Cited

U.S. PATENT DOCUMENTS

| | | | |
|---|---|---|---|
| 5,097,351 A | 3/1992 | Kramer | 359/17 |
| 5,502,709 A | 3/1996 | Shinada | 369/119 |
| 5,504,619 A | 4/1996 | Okazaki | 359/495 |
| 5,796,511 A | 8/1998 | Allen | 359/305 |

FOREIGN PATENT DOCUMENTS

| | | | |
|---|---|---|---|
| EP | 0 475 399 A2 | 3/1992 | |
| JP | A-5-27188 | 2/1993 | ........... G02B/26/10 |
| JP | A-5-276335 | 10/1993 | ............ H04N/1/04 |

OTHER PUBLICATIONS

Schaum's Mathematical Handbook, text book, Murry Speigel, 1991 (No month).
Fundamental of Physics, text book, Halliday et al., 1993 (No Month).

*Primary Examiner*—James Phan
(74) *Attorney, Agent, or Firm*—Sughrue Mion, PLLC

(57) ABSTRACT

There is proposed a method and apparatus for multibeam scanning an inner face of a cylindrical drum, in which scanning lines are straightened under a simple control, and an interval between the scanning lines can be easily changed, thereby simplifying a constitution. In an embodiment, while keeping an interval between two light beams projected to an optical scanning system, the light beams are one-dimensionally deflected in mutually orthogonal directions in synchronism with a rotation of the spinner, respectively. In a second embodiment, one light beam is projected along a central axis common with the spinner and the cylindrical drum to the spinner. The other light beams are inclined in a plane including the central axis by a constant angle $\phi_y$ separately predetermined for each of the other light beams, and further inclined in a direction orthogonal to the plane including a rotation axis by an angle $\phi_x$ which is determined in synchronism with a rotation angle $\theta$ of the spinner.

12 Claims, 11 Drawing Sheets

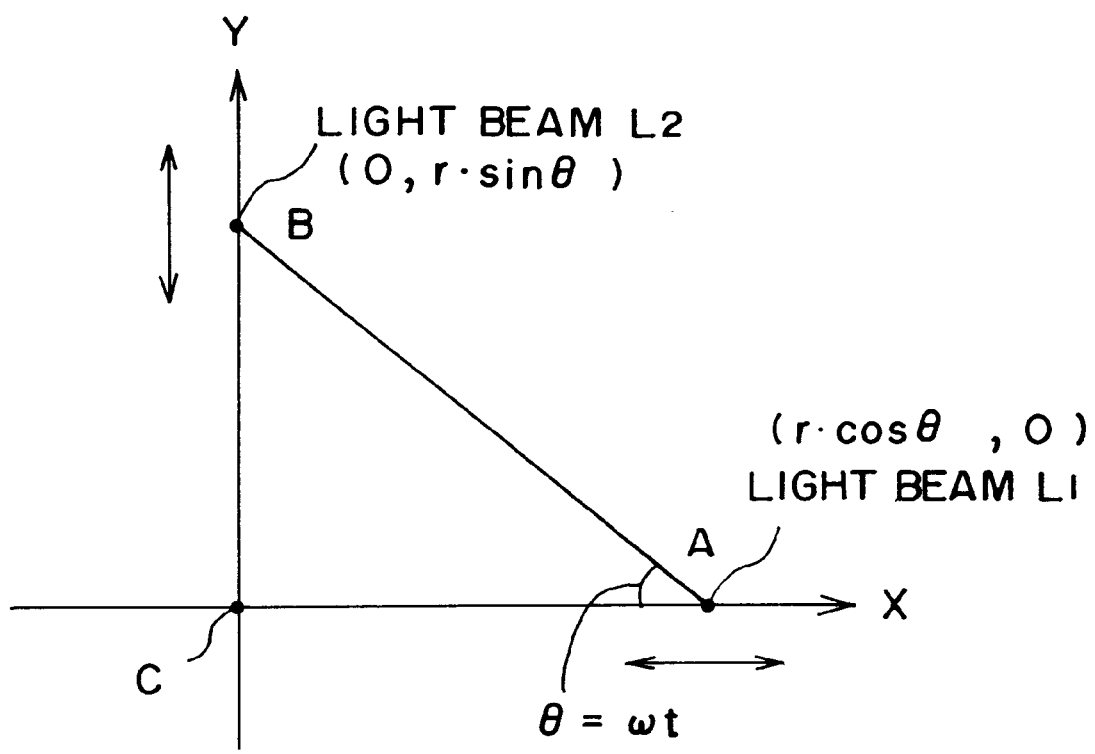

METHOD AND APPARATUS FOR INNER FACE SCANNING WITH MULTI BEAMS

This is a continuation of application Ser. No. 08/961,498 filed Oct. 30, 1997, abandoned, the disclosure of which is incorporated herein by reference.

BACKGROUND OF THE INVENTION

1. Field of the Invention

The present invention relates to a method and an apparatus for scanning an inner face of a cylindrical drum with dual or more light beams, and more particularly to a method and an apparatus for scanning an inner face of a cylindrical drum with plural light beams which are combined and introduced into a common optical scanning system to scan the inner face of the drum.

2. Description of the Prior Art

There is known an inner face scanning type of a light beam scanning device, wherein a light beam such as a laser beam is introduced into a cylindrical drum to scan an interior surface of the drum. To increase a recording speed in the apparatus of this type, a system with plural light beams, i.e., a multi-beam scanning system is proposed.

In the inner face scanning type of apparatus, plural light beams are introduced along a central axis of the cylindrical drum to a rotating deflector (spinner) disposed on and rotated about the central axis of the cylindrical drum. The spinner deflects incident light beams in a radial direction of the rotating drum. The spinner comprises, for example, a reflective mirror which rotates at a high speed with an angle of about 45° with respect to the central axis of the drum. However, when plural light beams are simply introduced to the spinner with maintaining the relative positions of the light beams, relative position of the light beams after deflected by the spinner periodically varies as a rotation angle of the spinner changes. Disposition of the light beam tracks on the inner face of the drum are varied with the rotational position of the reflective surface of the spinner. Therefore, plural scanning lines recorded on the recording drum are periodically curved and cross one another. A correct scanning cannot be achieved.

To avoid the curvatures and crossover of the scanning lines, it is proposed that one light beam among the plural light beams be used as a reference beam. The reference beam is aligned with a central axis of an optical scanning system (the central axis of the recording drum) and the other light beams are rotated about the reference beam in synchronism with rotation of the spinner. With such arrangement, since an interval between the respective light beams is constant, the curved scanning lines can be straightened. Also, by changing an interval between the reference beam and the other light beams, an interval between the scanning lines can be changed with maintaining the line separation thereof.

For example, the Japanese Laid-Open Patent Publication (KOKAI) Nos. 5-27188 (corresponding to U.S. Pat. No. 5,504,619) and 5-276335 disclose a system in which a deflecting element (prism or the like) with a fixed deflection quantity is rotated in synchronism with rotation of a spinner. Also, U.S. Pat. Nos. 5,097,351 and 5,502,709 propose a system in which light beams other than a reference beam are deflected two-dimensionally.

In the former system for rotating the deflecting element with the fixed deflection quantity, there is a problem that because of the constant deflection quantity, it is impossible to change a beam interval, therefore a scanning line interval cannot be changed. Although the scanning line interval is preferably changed with a recording density, the prior system cannot vary a scanning line density in accordance with the recording density. Also, stably to rotate the deflecting element in synchronism with the spinner rotating at a high speed, a highly precise mechanical rotation transmitting mechanism is necessary. However, this mechanism is hardly available, and expensive.

In the latter system for two-dimensionally deflecting the light beams, it is necessary to use plural deflectors, such as piezo-mirrors and acousto-optic elements (acousto-optic modulators, hereinafter referred to as AOM). Further, light beams need to be deflected two-dimensionally in opposite directions in a complicated manner while keeping a constant mutual relationship in two orthogonal directions (X, Y directions). Therefore, a complicated and precise control is required, and scanning quality is hardly stabilized. This leads to an expensive device.

SUMMARY OF THE INVENTION

The present invention has been accomplished under the circumstances as aforementioned, and a first object thereof is to provide a method of simultaneously scanning an inner face of a cylindrical drum with dual light beams, in which scanning lines are straightened under a simple control without using a two-dimensional light beam deflecting element, and a scanning line interval can be changed, thereby simplifying a constitution of a system.

A second object of the present invention is to provide an apparatus for simultaneously scanning an inner face of a cylindrical drum with dual light beams, in which scanning lines are straightened under a simple control without using a two-dimensional light beam deflecting element, and a scanning line interval can be changed, thereby simplifying a constitution.

A third object of the present invention is to provide a method of simultaneously scanning an inner face of a cylindrical drum with two or more light beams, in which scanning lines are straightened under a simple control, and a scanning line interval can be easily varied with a simple constitution.

A fourth object of the present invention is to provide an apparatus for simultaneously scanning an inner face of a cylindrical drum with two or more light beams, in which scanning lines are straightened under a simple control, and a scanning line interval can be easily varied with a simple constitution.

The first object of the present invention is attained by the provision of a method for dual light beams scanning an inner face of a cylindrical drum which comprises a spinner rotating within said drum, said spinner deflecting two light beams introduced into the drum toward the inner face of the drum to scan the inner face with the two deflected light beams, wherein said two light beams are one-dimensionally deflected in mutually orthogonal directions with each other, respectively, in synchronism with a rotation of said spinner, with keeping constant an interval between said two light beams, and then said two light beams are introduced to the spinner to be deflected to the inner surface of the drum.

In this case, on an image forming or focusing plane of the light beams, an X-Y rectangular coordinate system is assumed. The interval (distance) r between two light beams is set constant, an angular velocity of the spinner is set as ω, and an offset angle of the spinner from a maximum deflecting direction is set as ψ. The light beams are one-dimensionally deflected on an X-axis and on an Y-axis, so that a coordinate of one of the light beams on the image forming plane is (x=r·cos(ωt+ψ), y=0) and a coordinate of the other light beam on the image forming plane is (x=0, y=r·cos(ωt+ψ)).

The second object of the present invention is attained by the provision of an apparatus for simultaneously dual light beams scanning an inner face of a cylindrical drum, comprising:

a) two deflecting elements for one-dimensionally deflecting the two light beams in mutually orthogonal directions, respectively;

b) a spinner rotating coaxially with said cylindrical drum for deflecting said two light beams incident along a central axis of the cylindrical drum to scan the inner face of the cylindrical drum;

c) angle detecting means for detecting a rotation angle of the spinner;

d) a memory for storing deflection quantities of said deflecting elements necessary for one-dimensionally deflecting the light beams in mutually orthogonal directions in synchronism with the rotation of said spinner while keeping constant an interval between the two light beams; and e) deflecting element control means for driving said deflecting elements based on the deflection quantities stored in said memory.

In a preferable embodiment, a mechanism for compensating positions of the light beams is provided. The mechanism can be constituted as follows.

Beam position detecting means is provided for detecting image-beams or focusing are incident upon the spinner. Detected beam positions are compared with adequate positions which are obtained from adequate deflection quantities (angles) stored in the deflection quantity memory, and compensation quantities for compensating a difference between the positions are obtained and stored in a compensation quantity memory. Dual beam scanning is performed while controlling the deflection quantities by using compensation data.

When the compensating mechanism is provided, a preliminary scanning may be performed separately for each light beam prior to recording of image data. The compensation data of each light beam is obtained and stored. Therefore, influences of changes in temperature, changes in properties with an elapse of time, or the like of the optical system or the like can be eliminated. A correct, highly precise scanning can be achieved.

The compensation data may be re-written at adequate times. For example, when power is turned on, every time a predetermined time elapses, every time of output of predetermined pages of image, as required by an operator, and at other times, an instruction for re-writing can be given.

As the light beams, laser beams are suitable. In this case, as the one-dimensional light beam deflecting elements, acousto-optic modulating elements (AOM) are preferably used. The beam position detecting means can be constituted by disposing a quarter position detecting element around the image forming or focusing plane. The image focusing plane may be obtained by splitting a composite light beam with a beam splitter.

The third object of the present invention is attained by the provision of a method for scanning an inner face of a cylindrical drum with plural light beams, said drum comprising a spinner rotating on a central axis of the drum to deflect each light beam to the inner face of the drum, wherein one light beam passes along a central axis common with said spinner and the cylindrical drum and is projected into the spinner, and wherein other light beams are inclined in a plane including said central axis by a constant angle $\theta_y$ which is separately predetermined for each of said other light beams and further inclined in a direction orthogonal to said plane by an angle $\phi_x$ which is determined in synchronism with a rotation angle $\theta$ of the spinner.

In the preferable embodiment, the inclination angle $\phi_x$ may be determined in accordance with the formula $\theta \neq 0$, then $\phi_x = \phi_y(1-\cos \theta / \sin \theta)$, and $\theta = 0$, then $\phi_x = 0$.

In this manner, since the inclination angle $\phi_y$ in the Y-direction is a fixed value, only the inclination angle $\phi_x$ in the X-direction can be calculated. Therefore, especially a constitution of an arithmetic operation circuit is simplified.

Also, since a scanning line interval d can be determined by $d = f \cdot \phi_y$, in which f is a focal length of a focusing lens (converging lens), conversely, the Y-direction inclination angle $\phi_y$ can be determined by $\phi_y = d/f$ to obtain a desired interval d. Therefore, setting of the interval d between the scanning lines is very simple.

Three or more light beams can be used. In this case, one light beam (the reference beam) is placed on the central axis of the spinner, a second light beam is inclined (deflected) by $\phi_y = d/f$ in the Y-direction, and third and subsequent light beams are tilted by $-\phi_y, 2\phi_y, -2\phi_y, 3\phi_y, \ldots$ in the Y-direction. The X-direction inclination angle $\phi_x$ of each light beam is obtained by the arithmetic operation using the corresponding Y-direction inclination angle $\phi_y, -\phi_y, 2\phi_y, -2\phi_y, 3\phi_y, \ldots$.

In the above method, from the reference beam, the other light beams are deviated in time in a main scanning direction, i.e., in scanning phase. The deviation in phase can be eliminated by correcting a clock timing of an image signal. An arithmetic operation is described later.

The fourth object of the present invention is attained by a provision of an apparatus for scanning an inner face of a cylindrical drum with plural light beams, said drum having a spinner rotating on a central axis of the drum to deflect said plural light beams to the inner surface of the drum, one of the plural light beams passing along a central axis common with said spinner and the drum to be projected to the spinner, comprising:

angle detecting means for detecting a rotation angle $\phi$ of the spinner; and a light beam deflecting element for deflecting the other light beams in a plane including said central axis by a constant angle $\phi_y$ which is separately predetermined for each of the other light beams, and in a direction orthogonal to said plane including a rotation axis by an angle $\phi_x$ which is determined in synchronism with the rotation angle $\theta$ of the spinner.

BRIEF DESCRIPTION OF THE DRAWINGS

FIG. 4 is an explanatory view showing a principle of a deflection control according to the first embodiment of the present invention;

DETAILED DESCRIPTION OF THE PREFERRED EMBODIMENTS
FIRST EMBODIMENT

A principle of a first embodiment according to the present invention is now described with reference to FIGS. 4, 5 and 6. FIG. 4 is an explanatory view of a deflection control of light beams $L_1$ and $L_2$, the light beams $L_1$ and $L_2$ being directed from a light source along a central axis C of a recording cylindrical drum toward a spinner 30. FIGS. 5A–5D are explanatory views showing a relationship between a rotary position of the spinner 30 and positions of the light beams $L_1$ and $L_2$. FIGS. 6A–6D are perspective views of the spinner. In the following description, an offset angle is ψ=0. Specifically, a plane including the light beams $L_1$ and $L_2$ coincides with a maximum deflecting direction of the spinner.

The light beam $L_1$, as shown in FIG. 4, reciprocates along an X-axis in an X-Y rectangular coordinate system with an origin of the central axis C on an image focusing plane of the light beams. Also, the light beam $L_2$ reciprocates along a Y-axis. When a straight line AB connecting image focusing loci positions A and B of the light beams $L_1$ and $L_2$ forms an angle θ(=ωt) with the X-axis, a coordinate of A is (x=r·cosθ, y=0) and a coordinate of B is (x=0, y=r·sinθ). Here, a distance between A and B is $d=(x^2+y^2)^{1/2}=r$. Then, when r is constant, the beam $L_1$ rotates around the beam $L_2$ with a radius r and an angular velocity ω. In the same manner, the beam $L_2$ rotates around the beam $L_1$ on the same conditions.

The state is described with reference to FIGS. 5 and 6. In FIGS. 5A to 5D, a view of beam positions on an image forming or focusing plane P1 shown in FIG. 3 when the phase (rotation angle) θ changes by 90° and a corresponding side view of the spinner 30 are arranged on left and right. FIGS. 6A to 6D show positions of the spinner 30 varying in accordance with changes in phase (angle) θ shown in FIG. 4.

Figure 5A:
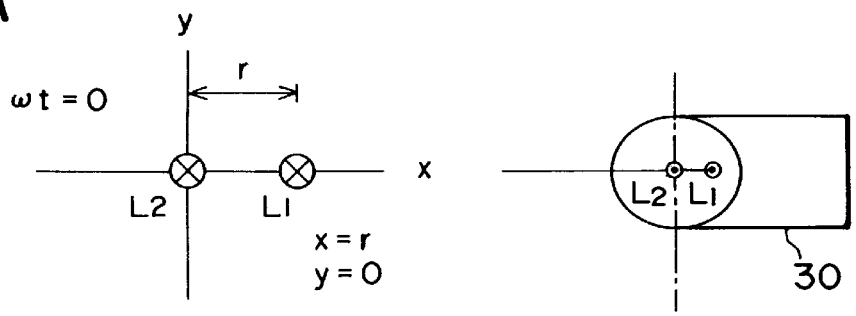
FIGS. 5A to 5D are explanatory views showing a relationship between a rotary position of a spinner and a light beam position in the first embodiment, the left sides showing beam positions on an image forming plane P1 shown in FIG. 3, and the right sides showing corresponding side views of the spinner.
Figure 5B:
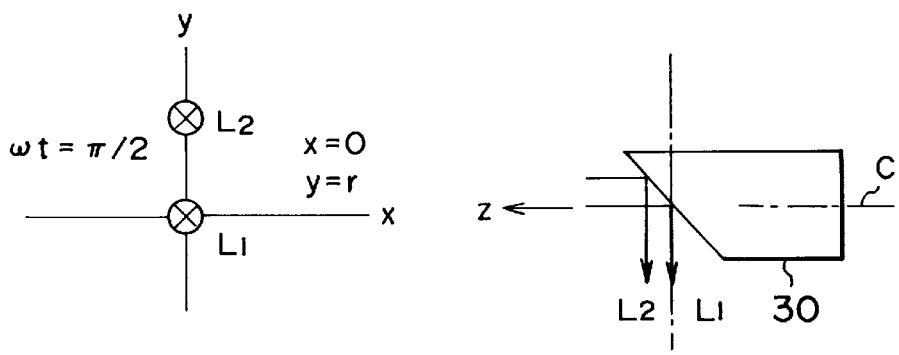
Figure 5C:
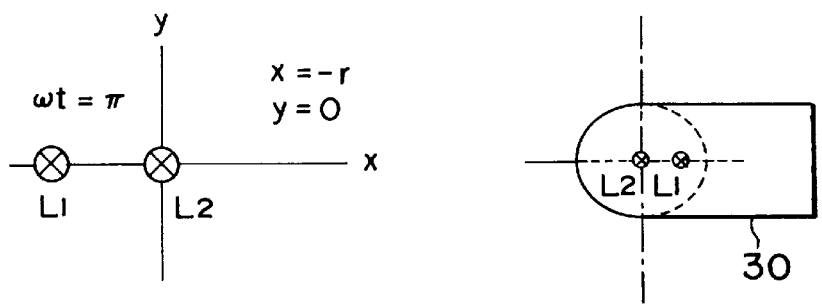
Figure 5D:
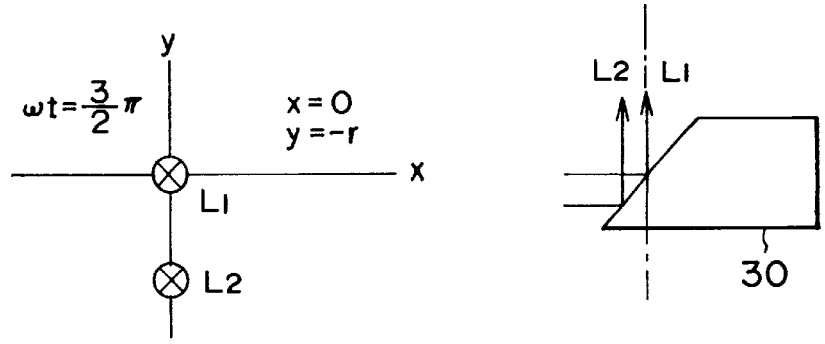
Figure 6A:
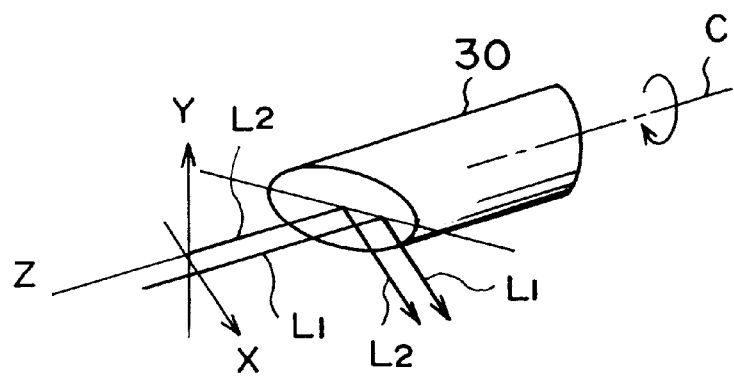
FIGS. 6A to 6D are perspective views of the spinner corresponding to FIGS. 5A to 5D, respectively, and show positions of the spinner in accordance with changes in phase (angle) φ shown in FIG. 4.
Figure 6B:
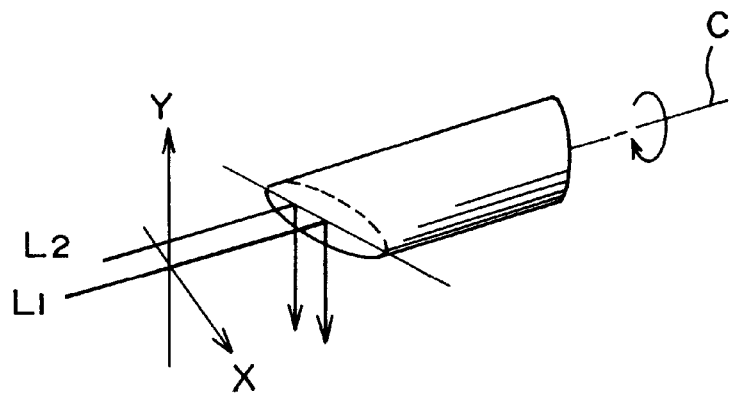
Figure 6C:
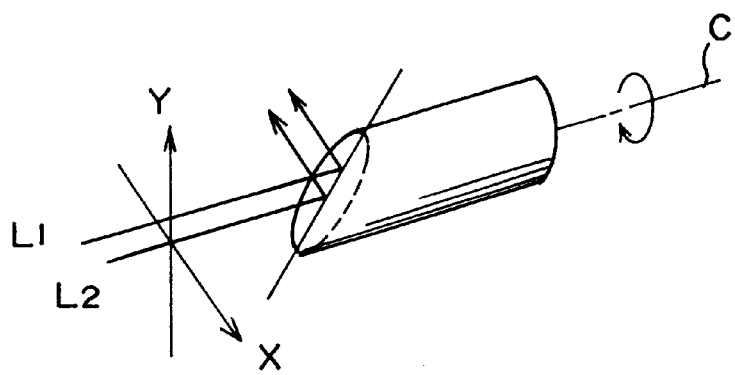
Figure 6D:
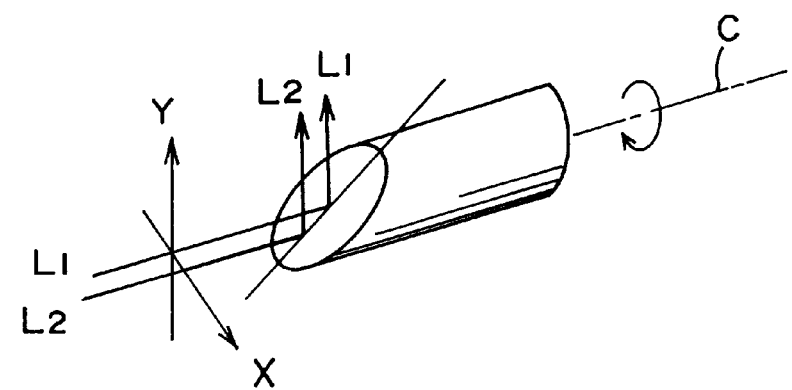

In FIG. 5A, at the time of ωt=(0±2n)π radian (n: integer), the light beam $L_1$ is positioned at (r, 0) and the light beam $L_2$ at (0, 0). In the same manner, FIGS. 5B, 5C and 5D shows a condition of ωt=(1/2±2n)π, ωt=(1±2n)π, and ωt=(3/2±2n)π, respectively. In the condition of FIG. 5A, the light beams $L_1$ and $L_2$ reflected by the spinner 30 are guided in a direction of X-axis. Accordingly, the light beams $L_1$ and $L_2$ are projected to an inner face of a cylindrical drum with keeping the order of $L_1$ and $L_2$ in the direction of the central axis C (a direction of Z-axis).

When the phase changes by π/2 radian to reach the condition of FIG. 5B, a coordinate of the light beam $L_1$ on the image forming plane is (x=0, y=0) and a coordinate of the light beam $L_2$ on the image forming plane is (x=0, y=r). At the same time, the spinner 30 is also rotated by π/2 radian to reach the condition shown in FIG. 6B. In this situation, the light beams $L_1$ and $L_2$ are reflected in a direction of -Y-axis. The order of the light beams $L_1$ and $L_2$ projected to an inner face of a recording drum will be kept in the direction of Z-axis. As understood from the above, when the light beams $L_1$ and $L_2$ periodically change their positions in synchronism with rotation of the spinner 30, the light beams $L_1$ and $L_2$ draw parallel, straight scanning lines (main scanning lines) on the inner face of the cylindrical drum. Also, by changing a distance r between the light beams $L_1$ and $L_2$, an interval between the scanning lines can be changed.

The above explanation is based on a condition such that the spinner has no offset relative to the two light beams, that is to say, the spinner is oriented in a direction which has a maximum angle by which the light beams incident upon the spinner are deflected (a maximum deflecting direction of the spinner). When the spinner is constituted of a reflective mirror forming an angle of 45° with a drum central axis, the incident light beams are deflected by 90° accordingly.

When the maximum deflecting direction of the spinner (in FIGS. 5 and 6, a longitudinal (or longer diameter) direction of an elliptic mirror surface of the spinner 30) does not coincide with a plane including two light beams, the offset angle is ψ, then the respective light beams may be one-dimensionally deflected on the X-axis and Y-axis, so that the coordinate of one light beam on the image forming plane is $$(x=r \cdot \cos(\omega t+\psi), y=0),$$

and the coordinate of the other light beam on the image forming plane is $$(x=0, y=r \cdot \sin(\psi t+)).$$

Thereby, both the light beams draw parallel, straight scanning lines (main scanning lines) on the inner face of the cylindrical drum.

Figure 1:
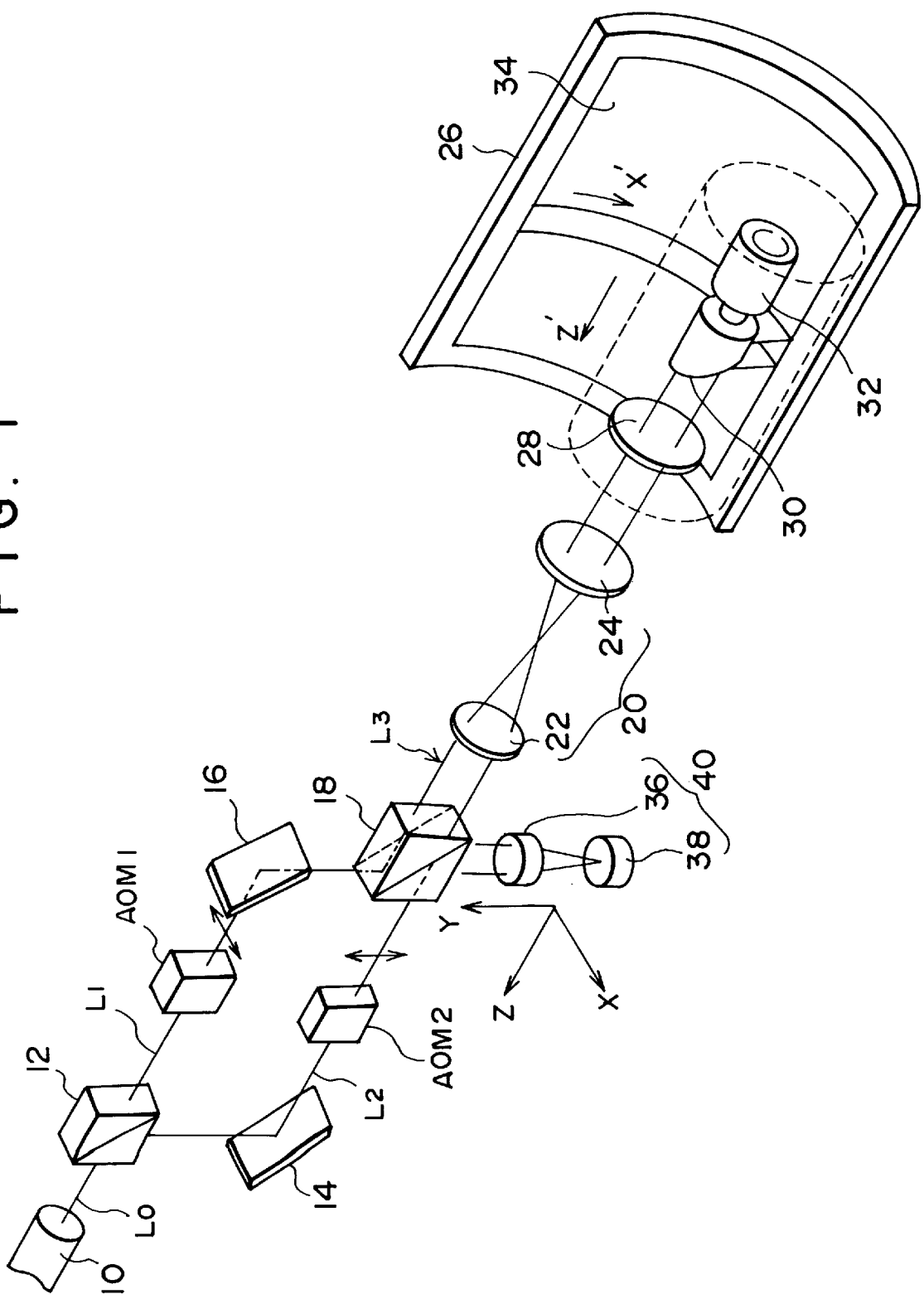
FIG. 1 is a perspective view showing a drum-inner-face scanning apparatus operated in a principle according to a first embodiment of the present invention.
Figure 2:
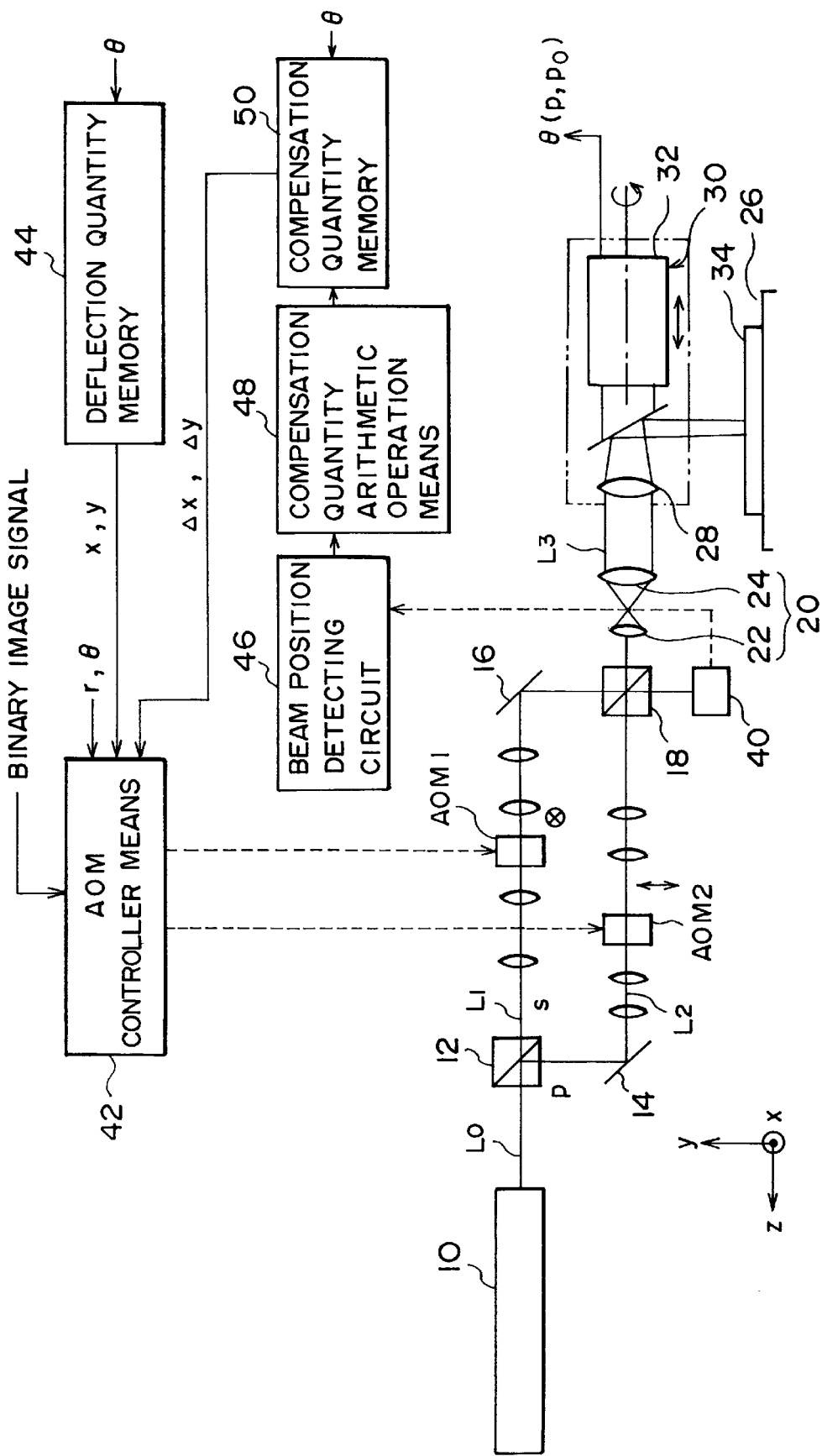
FIG. 2 is a block diagram showing a deflection control of the apparatus shown in FIG. 1.
Figure 3:
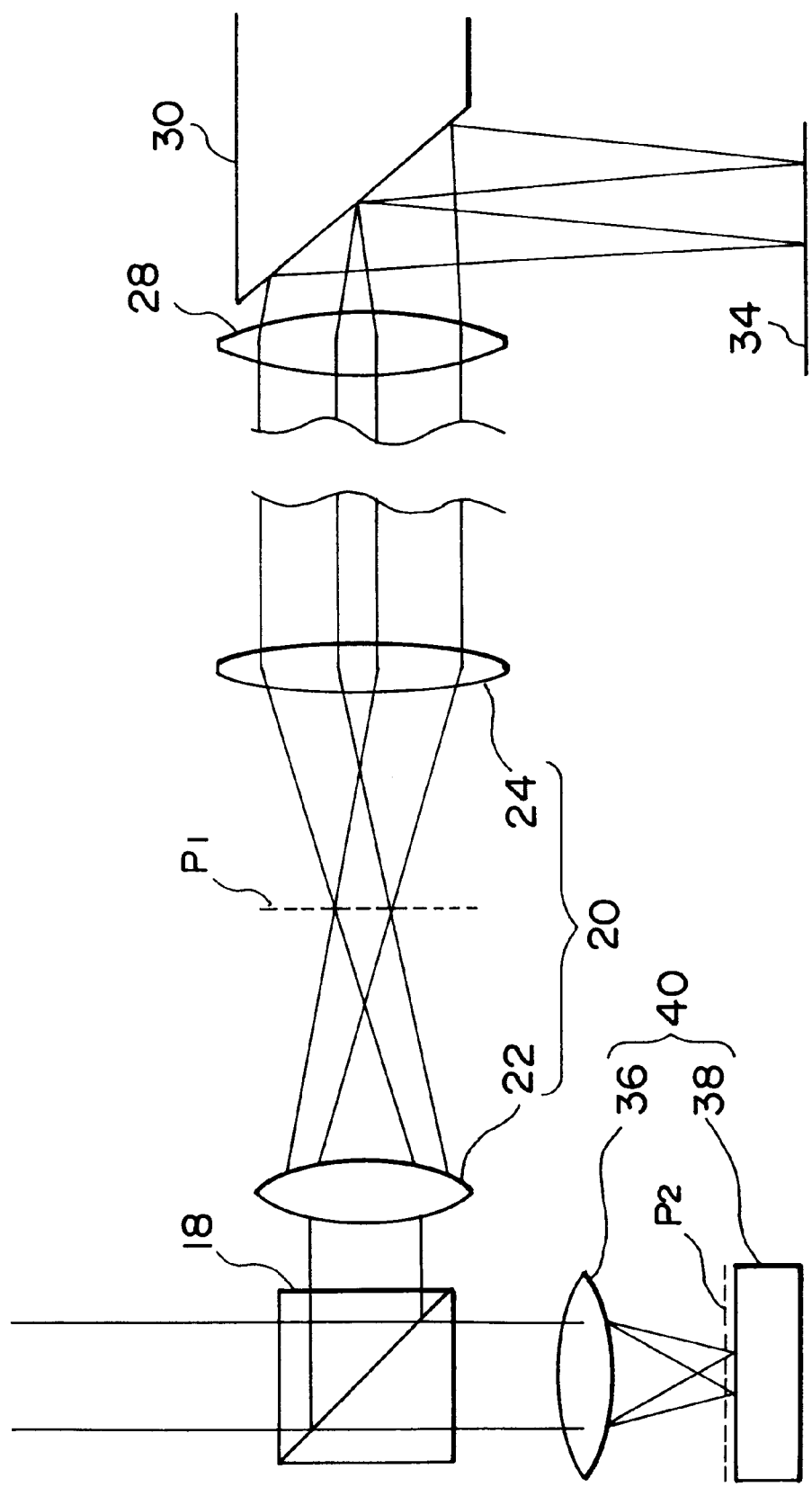
FIG. 3 is an explanatory view of a beam position detecting means provided in the device of FIG. 1.

FIG. 1 is a partially omitted conceptual representation of a light beam scanning device for scanning according to the principle of the first embodiment. FIG. 2 is a block diagram of a control system. FIG. 3 is an explanatory view of beam position detecting means.

In FIGS. 1 and 2, reference numeral 10 denotes a laser source such as a He-Ne laser, or an Ar laser or the like. One laser beam $L_0$ emitted from the laser source 10 is split by a polarizing beam splitter 12 into a P-polarized beam (the polarized beam with an electric field oscillating plane parallel with an incident plane including an incident beam and a reflective beam) and S-polarized beam (the polarized beam with the electric field oscillating plane vertical to the incident plane). The P-polarized beam is the light beam $L_1$, which is projected via a group of lenses into an AOM1 as a one-dimensional light beam deflecting element.

The AOM1 is, as described later, driven by an ultrasonic wave with a specified frequency generated by a transducer. An incident light beam is diffracted with a standing wave produced by the ultrasonic wave. The primarily of one-dimensionally diffracted light is selected by a zero-dimensional light cutting plate (not shown). By varying the frequency of a drive signal (radio frequency signal, RF signal) of the AOM1, the diffraction angle of the light beam $L_1$ is slightly changed in a direction of X-axis (see FIGS. 1 and 2). Also, the drive signal (RF signal) is modulated by a binary image signal.

The S-polarized beam split by the beam splitter 12, i.e., the light beam $L_2$ is projected via a mirror 14 and a group of lenses into an AOM2. Its drive signal (RF signal) is modulated by a binary image signal. By varying the frequency of the drive signal, the deflection angle of the light beam $L_2$ can be slightly changed in a direction of Y-axis (see FIGS. 1 and 2).

Both light beams $L_1$ and $L_2$ are enlarged by the groups of lenses as shown in FIG. 2, respectively, then combined by a mirror 16 and a polarizing beam splitter 18. A composite light beam $L_3$ further has its diameter enlarged and changed by lenses 22 and 24 constituting a beam expander 20. The beam $L_3$ is then introduced along the central axis C of a drum (cylinder) 26 into the drum 26.

On the central axis C of the drum 26 provided are a focusing lens 28 and the spinner 30 which constitute an optical scanning system. The spinner 30 has a reflective mirror surface with an angle of about 45° relative to the central axis (rotation axis), and is rotated by a motor at a high speed. The motor is provided with a rotary encoder 32 as an angle detecting means for detecting the rotation angle ($\theta=\psi t$) of the spinner 30. Specifically, a pulse signal p is output at every specified rotation angle, and a reference position signal $p_0$ indicating a reference position of one rotation is also output. The light beam $L_3$ guided toward the spinner 30 passes the beam expander 20 and the converging lens 28 on the rotation axis, and is focused on the inner peripheral face of the drum 26 or on a recording sheet 34 held on the inner face of the drum 26.

Behind the beam splitter 18, an image focusing lens 36 is provided, so that a part of the light beams $L_1$ and $L_2$ having passed the beam splitter 18 is focused on the focal plane (image forming plane) P1 of the lens 22 and another conjugate focal plane P2. On the focal plane P2 or on a position slightly deviated from P2 provided is a quarter position detecting element 38 as a beam position detecting element, to detect beam positions of the light beams $L_1$ and $L_2$. The image focusing lens 36 and the quarter position detecting element 38 form beam position detecting means 40.

In FIG. 2, reference numeral 42 denotes an AOM controller as a deflecting element control means, which controls AOM1 and AOM2 in synchronism with the rotation angle $\theta$ of the spinner 30. A deflection quantity memory 44 stores deflection data for deflecting the light beams $L_1$ and $L_2$ one-dimensionally in the X-axis direction and the Y-axis direction, respectively. Specifically, a function of $x_0=\cos(\omega t+\psi)$, $y_0=\sin(\omega t+\psi)$ is stored in a form of a numerical table or expression.

The AOM controller 42 reads from the memory 44 the data $x_0$, $y_0$ corresponding to the rotation angle $\theta=\omega t$ of the spinner 30. By integrating separately inputted data of the distance r between the light beams $L_1$ and $L_2$, deflection quantities $x=r \cdot \cos(\omega t+\psi)$, $y=r \cdot \sin(\omega t+\psi)$ are obtained. Subsequently, by transmitting analog voltages corresponding to the deflection quantities x and y to a VCO (voltage control oscillator, not shown), drive frequencies fx and fy of AOM1 and AOM2 necessary for producing the deflection quantities x and y are obtained. The AOM controller 42 supplies drive signals (RF signals) with the drive frequencies fx and fy to AOM1 and AOM2, respectively, to drive these AOMs.

As a result, AOM1 and AOM2 can deflect the light beams $L_1$ and $L_2$ with $x=r \cdot \cos(\omega t+\psi)$, $y=r \cdot \sin(\omega t+\psi)$, respectively. During this operation, the light beams are also modulated with the binary image signal, and a picture element which turns on or off in accordance with the image signal is written on the scanning lines. Also, since diffraction efficiencies of AOM1 and AOM2 usually change with deflection angles, it is preferable to control voltages of the drive signals simultaneously to compensate the change of the diffraction efficiencies, controlled, so that intensities of the light beams $L_1$ and $L_2$ are made uniform.

In the first embodiment, the beam position detecting means 40 corrects variations in the deflection angles due to changes in temperature and characteristic changes with time in AOM1, AOM2, the optical system and the like. Specifically, prior to the recording of an image on the inner face of the drum, each of the beams $L_1$ and $L_2$ is preliminarily scanned. In this case, a part of the light beam $L_1$ or $L_2$ is split by the polarizing beam splitter 18 and guided via the image focusing lens 36 to the quarter position detecting element 38. The quarter position detecting element 38 outputs voltages corresponding to quantities of light incident upon four photo detecting elements. Based on a distribution of the output voltages, a beam position detecting circuit 46 obtains the beam position of the light beam $L_{1\,or\,L2}$, i.e., the beam position on the image forming plane P2.

Thus obtained beam position periodically varies with the rotation angle $\theta$ of the spinner 30. The obtained beam position is compared with a normal beam position in a processor 48 as compensation quantity arithmetic operation means. Here, the data indicating the normal beam position is $x=r \cdot \cos(\omega t+\psi)$, $y=r \cdot \sin(\omega t+\psi)$ which is stored in the deflection quantity memory 44. Differences from the normal beam position are used as deflection quantities $\Delta x$, $\Delta y$ to be compensated. The processor 48 determines the compensation quantity $\Delta x$, $\Delta y$ for shifting the detected beam positions to adequate positions. Data indicating the deflection quantities $\Delta x$, $\Delta y$ is also stored in a compensation quantity memory 50. In this manner, the compensation data of the light beams $L_1$ and $L_2$ are stored.

In the real scanning operation for the image recording, on the inner face of the drum, the AOM controller 42 reads from the deflection quantity memory 44 the deflection quantities x and y corresponding to the rotation angle $\theta=\omega t+\psi$ of the spinner 30. The AOM controller also reads from the compensation quantity memory 50 the compensation quantities $\Delta x$, $\Delta y$ corresponding to the same rotation angle $\theta$. Sums of these quantities (x+$\Delta x$), (y+$\Delta y$) are used as the deflection quantities with regard to the light beams $L_1$ and $L_2$, respectively. The AOM controller means 42 generates drive signals of frequencies corresponding to these compensated quantities (x+$\Delta x$), (y+$\Delta y$), and modulates the drive signals with the binary image signal before supplying the drive signals to AOM1 and AOM2, respectively.

As a result, the light beams $L_1$ and $L_2$ are deflected to correct positions, and can draw two equally spaced, straight scanning lines on the interior surface of the cylindrical drum 26. Also, the spinner 30, while rotating once, moves by a distance corresponding to an interval between two main scanning lines toward the central axis (in the Z-axis direction), i.e., in an auxiliary scanning direction.

As aforementioned, in the apparatus shown in FIGS. 1 and 2, one laser beam $L_0$ from the laser source 10 is split into two light beams $L_1$ and $L_2$ by the polarizing beam splitter 12. Other structures shown in FIGS. 7, 8 and 9 are also available.

Figure 7:
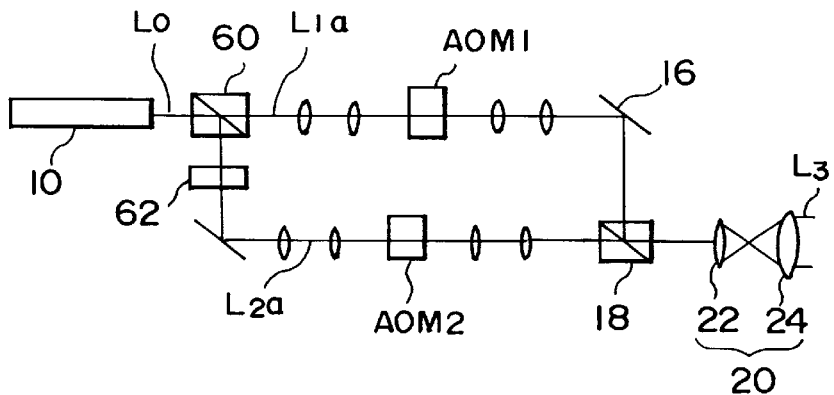
FIG. 7 is a conceptual representation of a light beam emitting section and an optical system in another apparatus to which the principle of the first embodiment is applied.

In a device shown in FIG. 7, one laser beam $L_0$ emitted from the gas laser source 10 such as He-Ne laser or Ar laser is split by a beam splitter 60 into two laser beams $L_1a$ and $L_2a$. To one laser beam $L_2a$, a phase difference of $\lambda/2$ is given by a $\lambda/2$ wavelength plate 62. Two laser beams $L_1a$ and $L_2a$, which are not interfering with each other in this manner, are deflected in the same optical system as the aforementioned, and combined. In FIG. 7, alike components are denoted with the same numerals and symbols as in FIG. 2, and therefore the description is not repeated.

Figure 8:
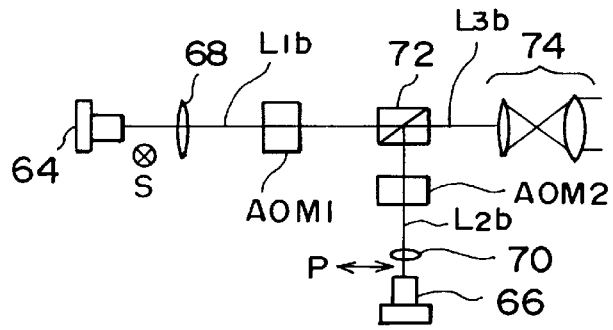
FIG. 8 is a conceptual representation of a light beam emitting section and an optical system in still another apparatus to which the principle of the first embodiment is applied.
Figure 9:
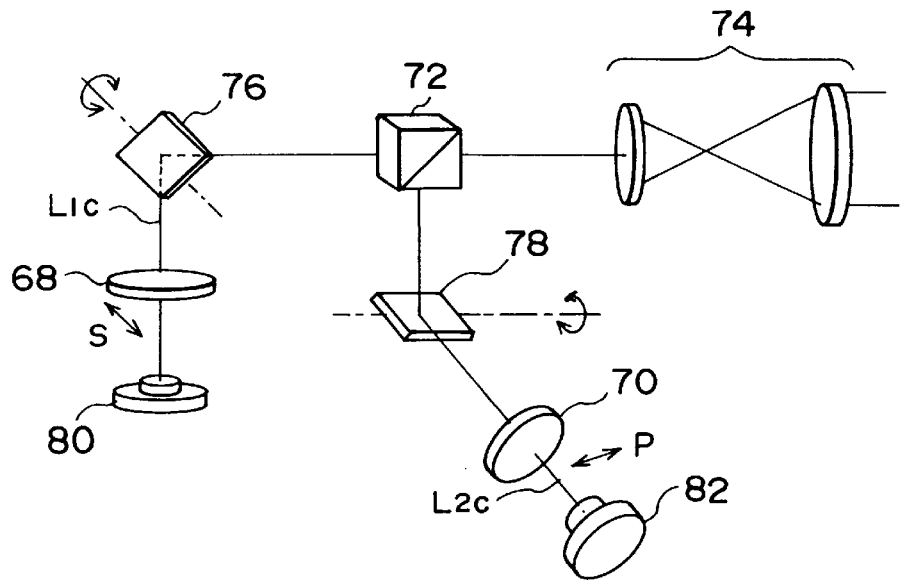
FIG. 9 is a conceptual representation of a light beam emitting section and an optical system in another device to which the principle of the first embodiment is applied.

In a device shown in FIG. 8, two laser diodes 64 and 66 are used. The laser diodes 64 and 66 emit linearly polarized light beams (laser beams) $L_1b$ and $L_2b$, respectively. Here, the laser diodes are arranged so that polarization directions are mutually orthogonal. Both light beams $L_1b$ and $L_2b$ are collimated by collimating lenses 68 and 70, subsequently guided via the AOM1 and AOM2 to a polarizing beam splitter 72, which combines both the light beams. A composite light beam $L_3b$ is guided via a beam expander 74 to an optical scanning system.

Further, when the laser diodes 64 and 66 are used as light sources in this manner, modulation by means of the binary image signal can be performed by the laser diodes 64 and 66. Specifically, based on the image signal, the laser diodes 64 and 66 are controlled to turn on and off. Therefore, AOM1 and AOM2 can only deflect the light beams $L_1b$ and $L_2b$, respectively.

In a device shown in FIG. 9, the AOM1 and the AOM2 in FIG. 8 are replaced by movable mirrors 76 and 78. Linearly polarizing directions of light beams $L_1c$ and $L_2c$ emitted from laser diodes 80 and 82 are set in such a manner that the laser beams are polarized to be S-polarized beam and P-polarized beam, respectively. The movable mirrors 76 and 78 rotate about axes parallel the respective polarizing directions, to deflect the light beams $L_1c$ and $L_2c$, respectively. In FIG. 9, the part identical to FIG. 8 is denoted with the same numerals or symbols and therefore the description is not repeated.

As the movable mirror 76 or 78 for use in the device of FIG. 9, a piezo-mirror using a piezo element, a galvano-mirror using a galvanometer, or the like is available. In the embodiment described with reference to FIGS. 1 to 6, the spinner 30 uses a mirror rotating at an angle of 45° relative to the central axis C of the drum 26. Instead of the mirror, by rotating a diffraction grating, the light beam (laser beam) can be introduced along the central axis C to the inner face of the drum.

According to the first embodiment of the present invention, two light beams introduced to the spinner are deflected one-dimensionally in mutually orthogonal directions while keeping a constant interval between the two light beams, in synchronism with a rotation cycle of the spinner. Accordingly, without using a two-dimensional light beam deflecting element, the interval between the scanning lines can be changed. With two light beams, a high quality of image can be recorded on the inner face of the cylindrical drum at high speed. Since the two-dimensional light beam deflecting element is unnecessary, a constitution of the apparatus is simple and inexpensive, and an operation is stabilized.

To one-dimensionally deflect two light beams in this manner, on the image forming plane of the light beams, the X-Y rectangular coordinate system is constituted with a reciprocating direction of one light beam $L_1$ being X-axis and a reciprocating direction of the other light beam $L_2$ being Y axis. In the coordinate system, the light beams are deflected so that the light beam $L_1$ is $x = r \cdot \cos(\omega t + \psi)$ and the other light beam $L_2$ is $y = r \cdot \sin(\omega t + \psi)$, respectively.

Preferably, the position of the light beam incident upon the spinner is detected by the beam position detecting means, the compensation quantity necessary for shifting the detected beam position to an adequate position is stored in the compensation quantity memory, and at the time of image recording, the compensation quantity is read from the compensation quantity memory, to correct the deflection quantity. By obtaining the compensation quantity at an adequate time, for example, prior to the image recording, and re-writing the content of the compensation quantity memory, the influence of changes in temperature or characteristics changes with an elapse of time or the like in the optical system can be eliminated. Additionally, the image quality can be enhanced.

As the light beams, laser beams are suitable. In the embodiment, as the one-dimensional light beam deflecting element, an acousto-optic element (AOM) can be used.

Second Embodiment

Figure 13:
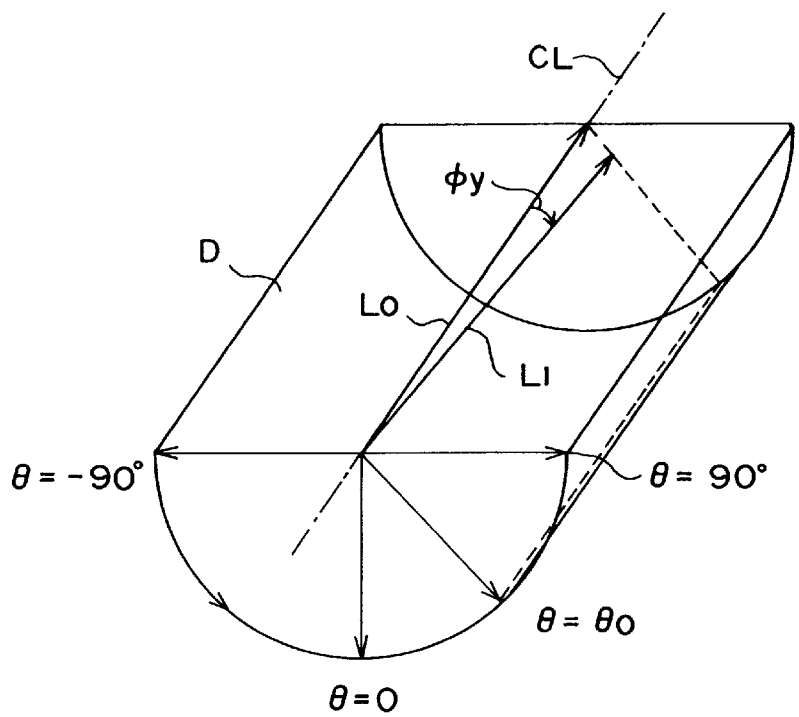
FIG. 13 is an explanatory view of a principle of a light beam deflection control according to the second embodiment.
Figure 14:
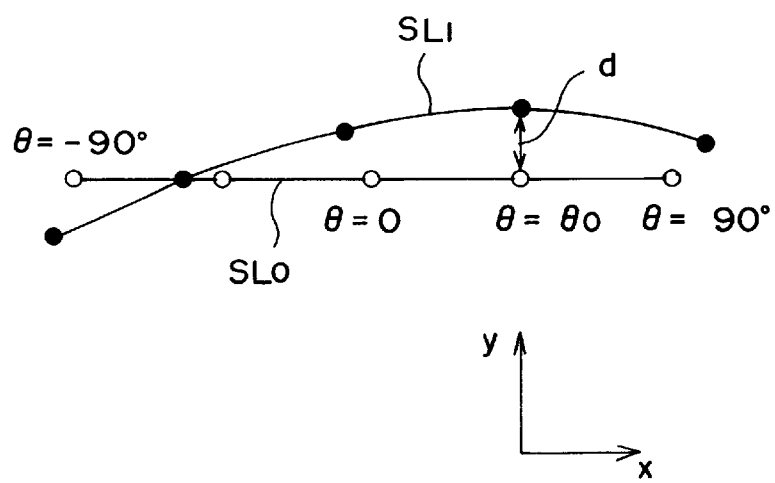
FIG. 14 shows scanning line tracks drawn on an inner face of a cylindrical drum when no control is effected on the light beams.
Figure 10:
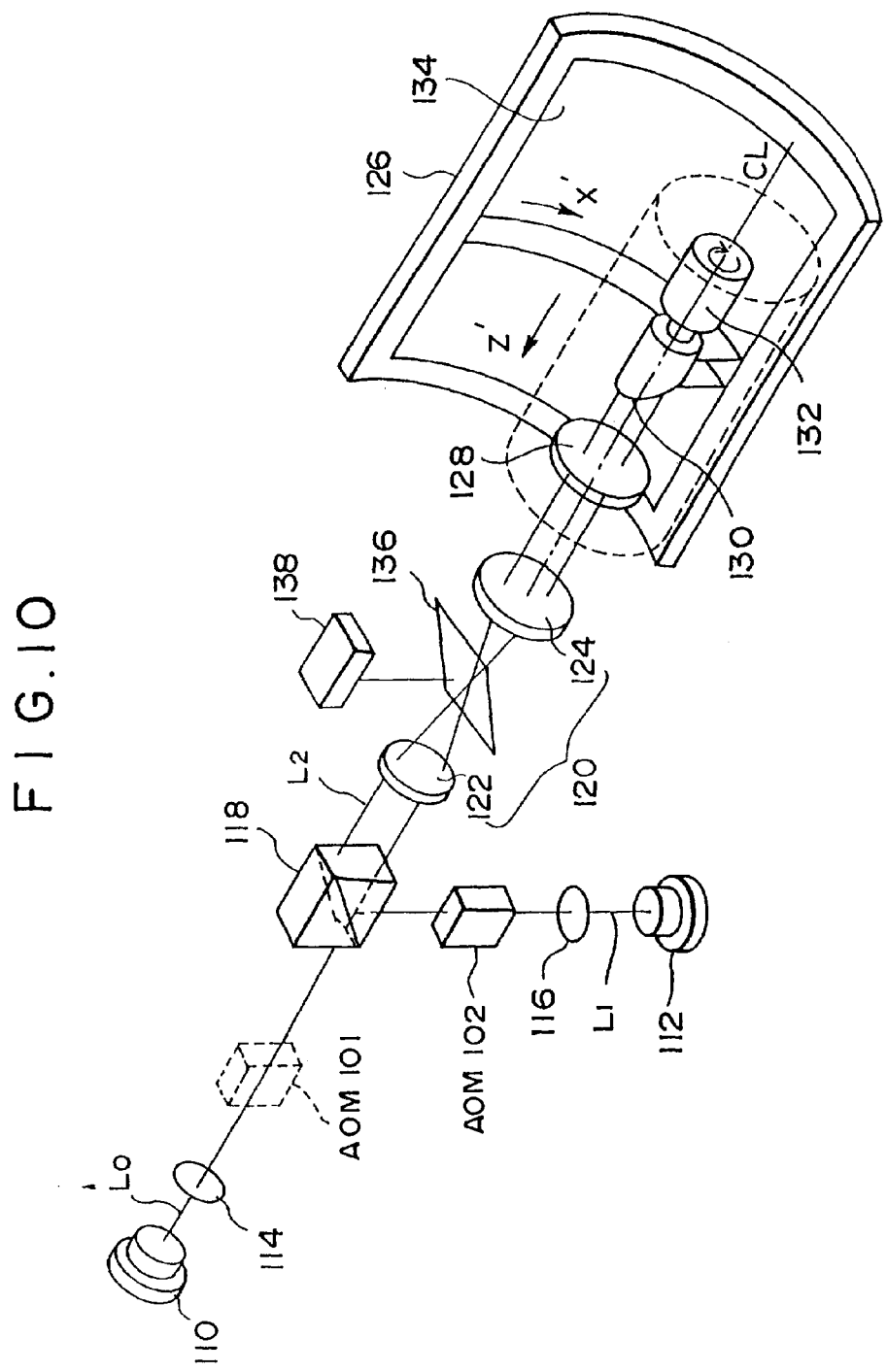

A principle of a second embodiment of the present invention is described with reference to FIGS. 13 and 14. FIG. 13 is an explanatory view showing a principle of a light beam deflection control according to the second embodiment, and FIG. 14 shows scanning line tracks drawn on an inner face of a cylindrical drum D. $L_0$ is a reference beam and $L_1$ is the other light beam. These light beams $L_0$ and $L_1$ pass a focusing lens (not shown), and are reflected in a radial direction of the drum D by a spinner which rotates on a central axis CL of the drum D to focus on the inner face of the drum D. The spinner is, for example, a reflective mirror which rotates at a high speed with an angle of about 45° relative to the central axis.

A rotation angle of the spinner relative to the drum D is represented by $\theta$. The reference beam $L_0$ is projected along the central axis CL of the drum D and draws a straight scanning line, i.e., a reference scanning line $SL_0$ on the inner face of the drum as shown in FIG. 14. The other beam $L_1$ is inclined with a slight angle of $\phi_y$ in a direction of $\theta = \theta_0$, to be incident upon the spinner. In the specification hereinafter, the light beam $L_1$ is also referred to as the oblique incident beam.

As shown in FIG. 14, the oblique incident beam $L_1$ draws a curved scanning line $SL_1$, which is most apart from the reference scanning line $SL_0$ when the rotation angle of the spinner is $\theta = \theta_0$. Since $\phi_y$ is a small angle, a distance d between the scanning lines is $d = f \cdot \tan\phi_y \approx f \cdot \phi_y$, in which f is a focal length of the focusing lens.

When a X-Y coordinate system is set on the drum D as shown in FIG. 14, the coordinate of the scanning line $SL_1$ drawn by the oblique incident beam $L_1$ can be expressed in following formulae.

$$x = f \cdot \phi_y \cdot \sin(\theta - \theta_0)$$
$$y = f \cdot \phi_y \cdot \cos(\theta - \theta_0)$$

In this condition, an incident direction of the oblique incident beam $L_1$ is inclined by $\phi_x$ in a direction orthogonal to a tilt direction of $\phi_y$. In this case, a coordinate position on the scanning line $SL_1$ of the oblique incident beam $L_1$ can be expressed in following formulae.

$$x = f \cdot \phi_y \cdot \sin(\theta - \theta_0) - f \cdot \phi_x \cdot \cos(\theta - \theta_0) \quad \text{(a)}$$

$$y = f \cdot \phi_y \cdot \cos(\theta - \theta_0) + f \cdot \phi_x \cdot \sin(\theta - \theta_0) \quad \text{(b)}$$

In the equations, $\phi_y$ is a constant, while $\phi_x$ is a variable which varies in synchronism with the rotation angle $\theta$ of the spinner and is a function of the angle $\theta$.

To make straight the scanning line $SL_1$ and set its distance from the reference scanning line $SL_0$ to a constant value d, y obtained in the above formula (b) must be the same as a constant value $d = f \cdot \phi_y$, and so $$f \cdot \phi_y = f \cdot \phi_y \cdot \cos(\theta - \theta_0) + f \cdot \phi_x \cdot \sin(\theta - \theta_0) \;\; \phi_y(1 - \cos(\theta - \theta_0)) = \phi_x \cdot \sin(\theta - \theta_0)$$
$$\therefore \phi_x = \phi_y(1 - \cos(\theta - \theta_0))/\sin(\theta - \theta_0) \quad \text{(c)}$$

provided that $\theta \neq \theta_0$

Further, when $\theta = \theta_0$, $\phi_x = 0$.

When a point of $\theta = \theta_0$ is an origin of the X-Y coordinate system, then an offset angle of the spinner is $\theta_0 = 0$. Therefore, the above formula (c) becomes as follows.

When $\theta \neq \theta_0$, $\phi_x = \phi_y(1 - \cos\theta)/\sin\theta$

When $\theta = \theta_0$, $\phi_x = 0$

From the above description, it can be seen that after $\phi_y$ is determined by $\phi_y = d_0/f$, so that the distance d between the scanning lines $SL_0$ and $SL_1$ is a predetermined distance $d_0$, $\phi_x$ is changed with the rotation of the spinner in accordance with the above formula (c), then the scanning lines $SL_0$ and $SL_1$ can be constituted of straight and parallel lines with the distance $d_0$ therebetween.

Further in this case, the scanning line $SL_1$ varies from the reference scanning line $SL_0$ in phase of an X direction (main scanning direction). The variance can be obtained in a following formula. Specifically, by substituting $\phi_x$ obtained in the formula (c) for $\phi_x$ in the formula (a), a following formula results.

$$\phi_x = f\phi_y \cdot \sin(\theta - \theta_0) - \frac{f \cdot \phi_y \cos(\theta - \theta_0)(1 - \cos(\theta - \theta_0))}{\sin(\theta - \theta_0)} \quad \text{(d)}$$

Therefore, a synchronizing signal (clock timing) of the scanning line $SL_1$ is delayed and compensated as much as $\phi_x$ obtained in the formula (d).

As aforementioned, according to the principle of the second embodiment of the present invention, when the interval or spacing between the scanning lines is set as d, the Y-direction inclination (deflection angle) $\phi_y$ is set as a constant value of d/f. Since only the X-direction inclination (deflection angle) $\phi_x$ may be obtained in the formula (c) for scanning, control is simplified.

Additionally, since $\phi_y$ can be a fixed value, to deflect the light beam in the Y-direction, for example, the mirror may be mechanically moved beforehand to a predetermined deflection angle. Therefore, an AOM element, a piezomirror or the like for changing deflection angle at a high speed is unnecessary, and an inexpensive constitution can be provided. Here, the arithmetic operation of $\phi_x$ can be performed in real time during scanning operation. Alternatively, a result of arithmetic operation, may be stored and the scanning operation is conducted while reading the stored results.

Figure 10:
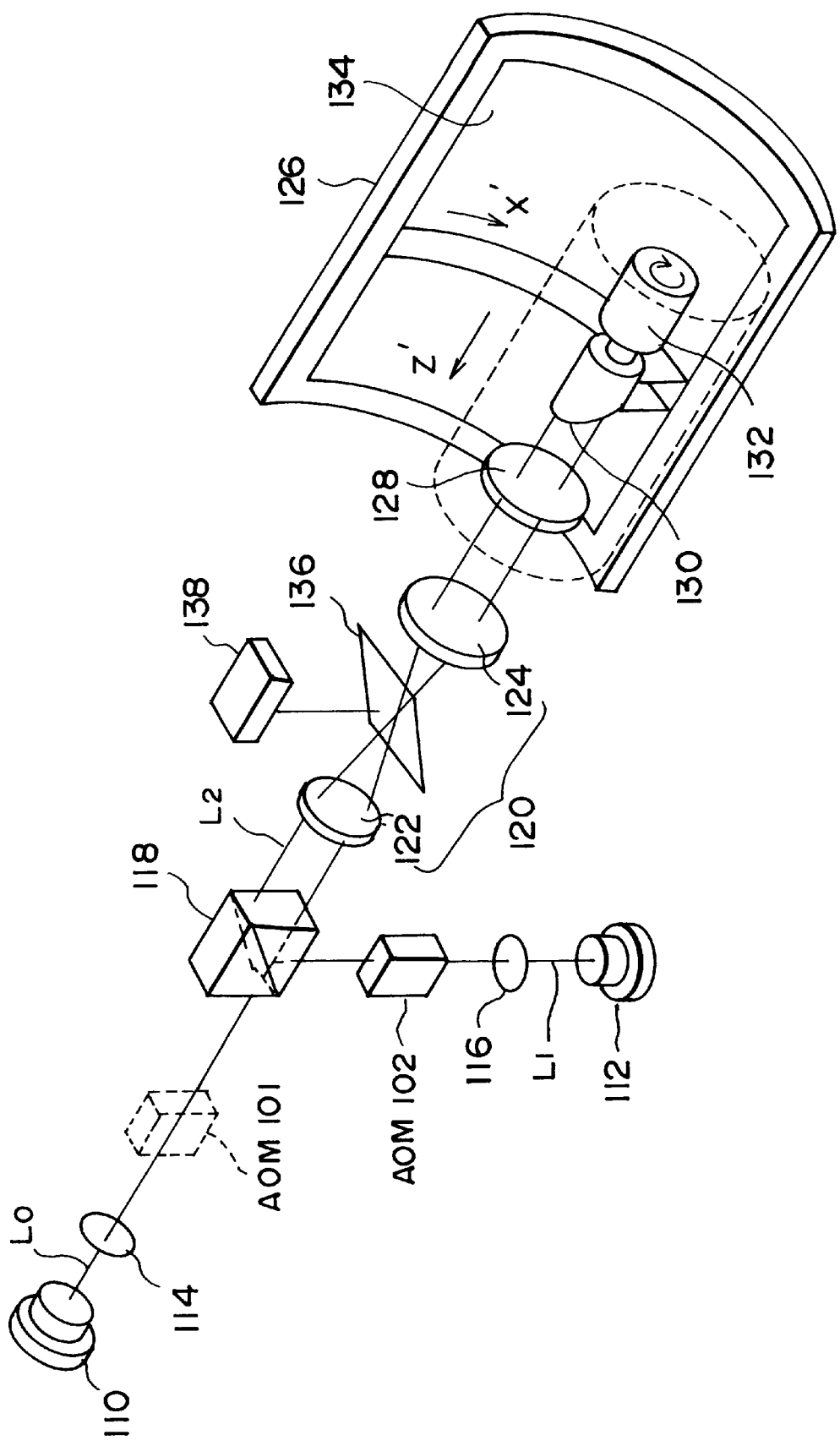
FIG. 10 is a perspective view showing a drum-inner-face scanning apparatus operated in a principle according to a second embodiment.
Figure 11:
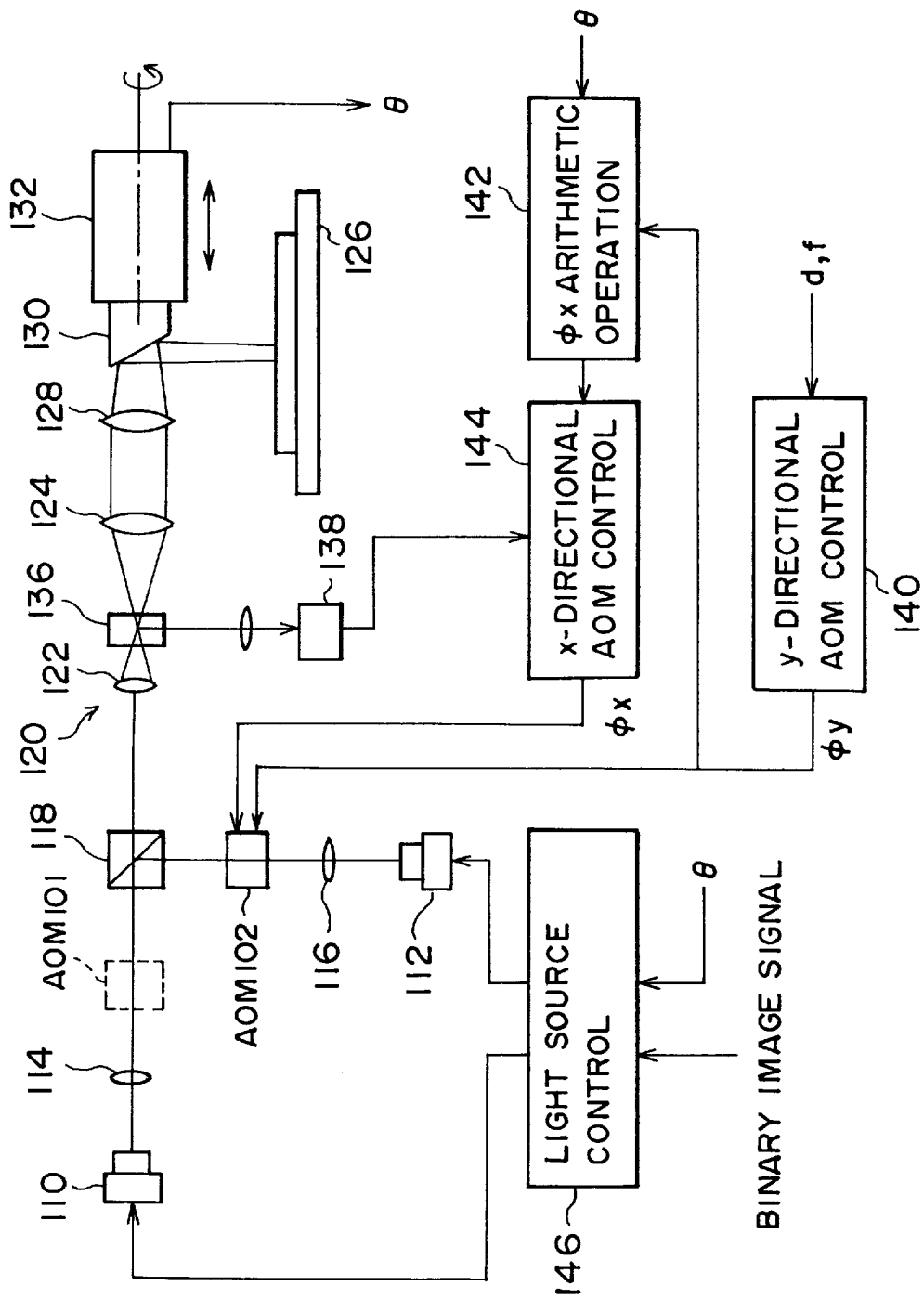
FIG. 11 is a block diagram showing a defection control of the apparatus shown in FIG. 10.

FIG. 10 is a partially omitted conceptual representation of a drum-inner-face scanning apparatus operated based on the principle of the second embodiment. FIG. 11 is a block diagram of its control system.

In FIGS. 10 and 11, reference numerals 110 and 112 are laser diodes. The laser diodes 110 and 112 emit linearly polarized light beams (laser beams) $L_0$ and $L_1$. Therefore, the laser diodes are arranged, so that polarization directions are orthogonal to each other. Both light beams $L_0$ and $L_1$ are collimated by the collimating lenses 114 and 116, subsequently, guided via acousto-optic modulating elements AOM101 and AOM102 to a polarizing beam splitter 118, which combines the light beams. Alternatively, when one light beam $L_0$ is used as a reference beam, the AOM101 can be omitted.

A composite light beam $L_2$ further has its beam diameter enlarged and changed by lenses 122 and 124 constituting a beam expander 120. The beam $L_2$ is guided along a central axis CL of a drum (cylinder) 126 into the drum 126.

On the central axis CL of the drum 126 provided are a focusing lens (converging lens) 128 and a spinner 130 which constitute an optical scanning system. The spinner 130 has a reflective mirror surface with an angle of about 45° relative to the central axis (rotation axis), and is rotated by a motor at a high speed. The motor is provided with a rotary encoder 132 as an angle detecting means for detecting a rotation angle ($\phi = \omega t$) of the spinner 130. The beam guided toward the spinner 130 passes the beam expander 120 and the focusing lens 128 disposed on the rotation axis, and is focused on an inner peripheral face of the drum 126 and a recording sheet 134.

Further, the beam expander 120 is provided with a beam splitter 136. By the beam splitter 136, a part of the composite beam $L_2$ is split and guided to a quarter position detecting element 138, so that beam positions of the light beams $L_0$ and $L_1$ are detected. The beam splitter 136 and the quarter position detecting element 138 form a beam position detecting means.

Each of the AOM101 and the AOM102 is driven by an ultrasonic wave generated by a transducer to diffract an incident light beam with a standing wave produced by the ultrasonic wave. In this case, one-dimensionally diffracted light is selected by a zero-dimensional light cutting plate (not shown). By changing the frequency of the ultrasonic drive signal, angles of the light beams $L_0$ and $L_1$ are changed.

AOM101 and AOM102 are capable of deflecting the light beams two-dimensionally. Specifically, they are provided with two sets of transducers in mutually orthogonal directions. A light beam introduced into AOM101 or AOM102 can be deflected independently in both orthogonal directions. Here, one light beam $L_0$ is used as the reference beam, and is positioned on the central axis CL of the drum 126 and the spinner 130.

If the reference beam $L_0$ can be precisely positioned on the central axis CL, the AOM101 is unnecessary. If this is difficult, however, a beam position of the reference beam $L_0$ is detected by the beam position detecting element 138, compensation data in AOM101 is stored, and at the time of scanning, the reference beam $L_0$ is correctly aligned with the central axis CL.

The AOM102, as aforementioned in the principle, tilts the oblique incident beam $L_1$ by $\phi_x$ and $\phi_y$ in the X and Y directions, respectively. The inclination angle $\phi_y$ is obtained in an AOM control 140, which applies to one transducer of the AOM102 a drive signal having a frequency for producing the inclination $\phi_y$. Here, as aforementioned, $\phi_y$ is a fixed value which is determined from a focal length f of the focusing lens 128.

In an $\phi_x$ arithmetic operation unit 142, $\phi_x$ is obtained. The arithmetic operation is performed in accordance with the above formula (c) using the spinner rotation angle θ and $\phi_y$. The result $\phi_x$ is transmitted to an AOM control unit 144, in which a frequency for producing the inclination $\phi_x$ is obtained. A drive signal having this frequency is applied to the other transducer of the AOM102. The arithmetic operation for $\phi_x$ can be performed in real time during scanning. Alternatively, by storing an operation result in a memory, data can be read from the memory during scanning.

Further, the beam position of the oblique incident beam $L_1$ is detected by the beam position detecting element 138. The detected beam position is returned to the AOM control unit 144 or 140. Then, the beam position may be corrected to coincide with $\phi_x$ or $\phi_y$. The correction can be performed in real time during scanning. Alternatively, a preliminary scanning can be performed to store data for the correction beforehand.

The laser diodes 110 and 112 are controlled by a light source control 146. The light source control 146 turns on or off the laser diodes 110 and 112 in accordance with a binary image signal based on a clock timing synchronized with the rotation angle θ of the spinner 130. Here, the laser diode 110 for emitting the reference beam $L_0$ is turned on and off at the clock timing in synchronism with the rotation angle θ. However, the laser diode 112 for emitting the oblique incident beam $L_1$ is turned on and off at the clock timing corrected in accordance with the above formula (d).

Figure 12:
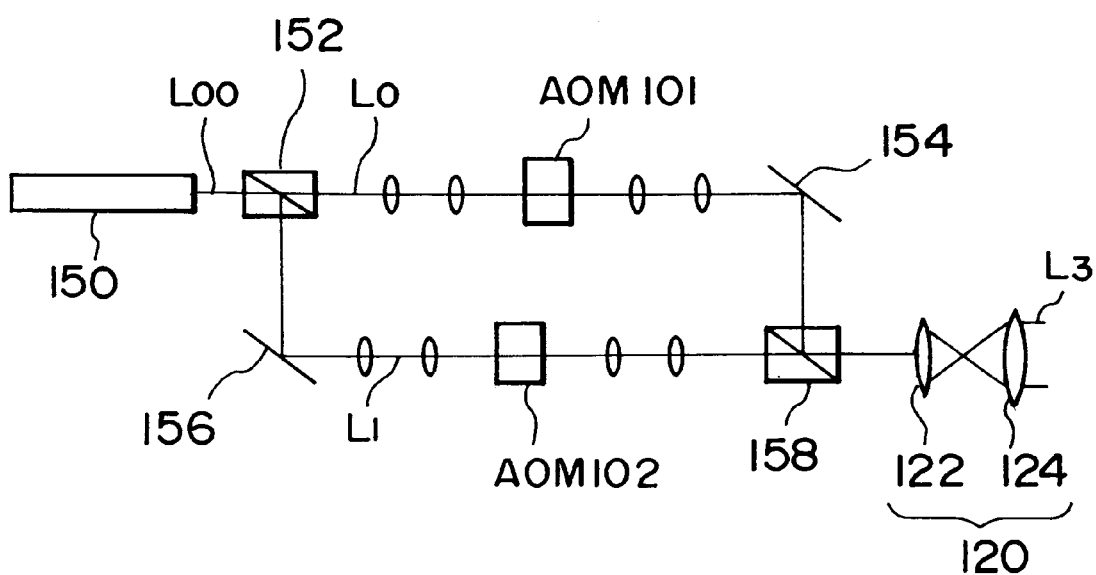
FIG. 12 is a conceptual representation of another apparatus to which the principle of the second embodiment is applied.

FIG. 12 shows another structure to which the principle of the second embodiment according to the invention is applied. In the figure, numeral 150 denotes a laser source such as He—Ne laser or Ar laser. One laser beam $L_{00}$ emitted from the laser source 150 is split by a polarizing beam splitter 152 into a P-polarized light beam (the polarized beam with an electric field oscillating plane being parallel with an incident plane including an incident light and a reflective light) and a S-polarized light beam (the polarized beam with the electric field oscillating plane being vertical to the incident plane). The P-polarized light beam is used as a reference beam $L_0$, and is projected via a group of lenses into the AOM101.

The S-polarized light beam $L_1$ split by the beam splitter 152 is projected via a mirror 156 and a group of lenses into the AOM102. Both light beams $L_0$ and $L_1$ are enlarged by the respective groups of lenses, and combined by a mirror 154 and a polarizing light beam splitter 158. In FIG. 12, the part identical to FIGS. 10 and 11 is denoted with the same numerals or symbols, and the description is not repeated.

In this embodiment, the AOM can be replaced by a movable mirror. As the movable mirror, a piezo-mirror using a piezo element, a galvano-mirror using a galvanometer, or the like may be used. In the aforementioned embodiment, the spinner 130 comprises a mirror which rotates at an angle of 45° relative to the central axis CL of the drum 126. Instead of the mirror, by rotating a diffraction grating, the light beam (laser beam) introduced along the central axis CL may be deflected to the inner face of the drum.

According to the second embodiment, one light beam as the reference beam is projected on the central axis of the spinner. The other oblique incident beam is inclined by a specified angle $\phi_y$ in the plane including the central axis, and also inclined in the direction orthogonal to the plane by the angle $\phi_x$ which is determined in a specified operation expression by using the-spinner rotation angle θ and $\phi_y$.

Therefore, the oblique incident beam is inclined in one direction by the fixed angle of $\phi_y$, and only in the other direction by the angle $\phi_x$ which is the function of the spinner rotation angel θ. Deflection control is simplified. Here, $\phi_x$ can be obtained by the formula (c). Additionally, a movable mechanism can be constituted with low cost. Also, the fixed angle $\phi_y$ can be determined from the scanning line interval d and the focal length f of the focusing lens, and therefore the interval d can be easily changed.

In the second embodiment, three or more light beams can be used. In this case, $\phi_y$ of the oblique incident beam may be set once, minus once, twice, minus twice, three times ... as much as d/f. Also in the invention, the scanning direction of the scanning lines are inevitably deviated with an elapse of time. To avoid such deviations, the clock timing of each light beam can be compensated with the spinner rotation angle.

What is claimed is:

1. A method for scanning an inner face of a cylindrical drum with two light beams, comprising the steps of:

introducing said two light beams into the drum;

deflecting said two light beams introduced into the drum by a spinner rotating within said drum, toward the inner face of the drum to scan the inner face with the two deflected light beams;

wherein said two light beams are one-dimensionally deflected in mutually orthogonal directions with each other, respectively, in synchronism with a rotation of said spinner, an interval between said two light beams, being kept constant, prior to said two light beams being introduced to the spinner;

wherein in an X-Y rectangular coordinate system on an image focusing plane of the light beams, an X axis being defined as a direction in which a first light beam of said two light beams reciprocates while being one-dimensionally deflected, a Y axis being defined as a direction in which a second light beam of said two light beams reciprocates while being one-dimensionally deflected, the light beams are one-dimensionally deflected so that said first light beam satisfies $x = r \cdot \cos(\omega t + \psi)$, $y = 0$ and said second light beam satisfies $x = 0$, $y = r \cdot \sin(\omega t + \psi)$ where r is an interval between both light beams ω is a rotation angular velocity of the spinner, t is a time and ψ is an offset angle in a maximum deflecting direction of the spinner.

2. The method according to claim 1, wherein the light beams are laser beams.

3. The method according to claim 2, wherein the light beams are one-dimensionally deflected with acousto-optic deflecting elements.

4. An apparatus for two light beams scanning simultaneously an inner face of a cylindrical drum, comprising:

two deflecting elements for one-dimensionally deflecting the two light beams in mutually orthogonal directions, respectively;

a spinner rotating coaxially with said cylindrical drum for deflecting said two light beams incident along a central axis of the cylindrical drum to scan the inner face of the cylindrical drum;

angle detecting means for detecting a rotation angle of the spinner;

a memory for storing deflection quantities of said deflecting elements necessary for one-dimensionally deflecting the light beams in mutually orthogonal directions in synchronism with the rotation of said spinner while keeping constant an interval between the two light beams; and deflecting element control means for driving said deflecting elements based on the deflection quantities stored in said memory;

wherein in an X-Y rectangular coordinate system on an image focusing plane of the light beams, an X axis being a direction in which a first light beam of said two light beams reciprocates while being one-dimensionally deflected, a Y axis being a direction in which a second light beam of said two light beams reciprocates while being one-dimensionally deflected, the deflection quantity for said first light beam is $$x=r \cdot \cos(\omega t+\psi) \text{ and } y=0, \text{ and}$$

the deflection quantity for said second light beam is $$x=0 \text{ and } y=r \cdot \sin(\omega t+\psi),$$

where r is an interval between both light beams, $\omega$ is a rotation angular velocity of the spinner, t is a time and $\psi$ is an offset angle in a maximum deflecting direction of said spinner.

5. The apparatus according to claim 4, which further comprising:

beam position detecting means for detecting positions of the two light beams incident upon the spinner on an image focusing plane;

a processor for obtaining compensation quantities necessary for shifting the detected beam positions to adequate positions, respectively; and a compensation quantity memory for storing the obtained compensation quantities, said deflection quantities being compensated with said compensation quantities by said deflecting element control means to control said two deflecting elements, respectively.

6. The apparatus according to claim 4, wherein the light beams are laser beams.

7. The apparatus according to claim 6, wherein said deflecting elements are acousto-optic deflecting elements.

8. A method for scanning an inner face of a cylindrical drum with plural light beams, said drum comprising a spinner rotating on a central axis of the drum to deflect each light beam to the inner face of the drum, said method comprising:

passing one light beam along a central axis common with said spinner and the cylindrical drum and projecting said one light beam into the spinner;

inclining other light beams in a plane including said central axis by a constant angle $\phi_Y$ which is separately predetermined for each of said other light beams and further inclining said other light beams in a direction orthogonal to said plane by an angle $\phi_x$ which is determined in synchronism with a rotation angle $\theta$ of the spinner;

wherein said angle $\phi_x$ is determined in accordance with the formula when $\theta \neq \theta_0$, $\phi_x=\phi_y(1-\cos(\theta-\theta_0))/\sin(\theta-\theta_0)$, and when $\theta=\theta_0$, $\phi_x=0$, where $\theta_0$ is an offset angle in a maximum deflecting direction of the spinner; and wherein said inclination angle $\phi_y$ is determined in accordance with the formula $$d=f \cdot \phi_y$$

where d is an interval between scanning lines drawn by said plural light beams on the inner face of the cylindrical drum, and f is a focal length of a common focusing lens on which the light beams are focused.

9. The method according to claim 8, wherein scanning is performed with three or more light beams, one of the light beams is laid on the central axis of the spinner, and each inclination angle $\phi_y$ of the other light beams is set as d/f multiplied by an integer.

10. The method according to claim 8, wherein deviations in main scanning lines drawn by the plural light beams with an elapse of time are compensated by synchronizing a clock timing of an image signal with the rotation angle $\theta$ of the spinner.

11. An apparatus for scanning an inner face of a cylindrical drum with plural light beams, said drum having a spinner rotating on a central axis of the drum to deflect said plural light beams to the inner surface of the drum, one of the plural light beams passing along a central axis common with said spinner and the drum to be projected to the spinner, comprising:

angle detecting means for detecting a rotation angle $\theta$ of the spinner; and a light beam deflecting element for deflecting the other light beams in a plane including said central axis by a constant angle $\phi_y$ which is separately predetermined for each of the other light beams, and in a direction orthogonal to said plane including a rotation axis by an angle $\phi_x$ which is determined in synchronism with the rotation angle $\theta$ of the spinner;

wherein said angle $\phi_x$ is determined in accordance with the formula when $\theta \neq \theta_0$, $\phi_x=\phi_y(1-\cos(\theta-\theta_0))/\sin(\theta-\theta_0)$, and when $\theta=\theta_0$, $\phi_x=0$, where $\theta_0$ is an offset angle in a maximum deflecting direction of the spinner; and wherein said inclination angle $\phi_y$ is determined in accordance with the formula $d=f \cdot \phi_y$ where d is an interval between scanning lines drawn by said plural light beams on the inner face of the cylindrical drum, and f is a focal length of a common focusing lens on which the light beams are focused.

12. The apparatus according to claim 11, wherein scanning is performed with three or more light beams, and each inclination angle $\phi_y$ of the light beams other than the light beam projected along the central axis of the spinner is set as d/f multiplied by an integer.

* * * * *

UNITED STATES PATENT AND TRADEMARK OFFICE
CERTIFICATE OF CORRECTION

PATENT NO. : 6,369,929 B2
DATED : April 9, 2002
INVENTOR(S) : Norihisa Takada

It is certified that error appears in the above-identified patent and that said Letters Patent is hereby corrected as shown below:

Drawings,
The drawing sheet, consisting of Fig. 10, should be deleted to be replaced with the attached page.

Column 6,
Line 54, delete "(x=0, y=r•sin(ψt+))", insert --(x=0, y=r•sin(ωt+ψ))--;

Column 7,
Line 38, delete "(θ=ψt)", insert --(θ=ωt)--;

Column 8,
Line 36, delete "$L_1$ or $_{L2}$", insert -- $L_1$ or $L_2$ --;

Column 11,
Lines 15-16, delete "$f•\phi_y=f•\phi_y•\cos(\theta-\theta_0)+ f•\phi_x•\sin(\theta-\theta_0)$ $\phi_y(1-\cos(\theta-\theta_0))=\phi_x•\sin(\theta-\theta_0)$
∴ $\phi_x=\phi_y(1-\cos(\theta-\theta_0))/\sin(\theta-\theta_0)$", Insert --$f•\phi_y=f•\phi_y•\cos(\theta-\theta_0)+ f•\phi_x•\sin(\theta-\theta_0)$
    $\phi_y(1-\cos(\theta-\theta_0))=\phi_x•\sin(\theta-\theta_0)$
      ∴ $\phi_x=\phi_y(1-\cos(\theta-\theta_0))/\sin(\theta-\theta_0)$--;

Column 11,
Line 41, delete "$\phi_x$", insert -- x --;
Line 46, delete "$\phi_x$", insert -- x --;

UNITED STATES PATENT AND TRADEMARK OFFICE
CERTIFICATE OF CORRECTION

PATENT NO. : 6,369,929 B2
DATED : April 9, 2002
INVENTOR(S) : Norihisa Takada

It is certified that error appears in the above-identified patent and that said Letters Patent is hereby corrected as shown below:

Column 14,
Line 1, delete "angel", insert -- angle --;

Column 15,
Line 55, delete "$\phi_Y$", insert -- $\phi_y$ --;

Signed and Sealed this

Sixth Day of August, 2002

Attest:

JAMES E. ROGAN
Director of the United States Patent and Trademark Office

Attesting Officer